Oct. 31, 1961 C. G. SHOOK 3,007,004

ELECTRONIC RATE MARKER

Filed Oct. 29, 1957 8 Sheets-Sheet 1

INVENTOR
CARL G. SHOOK
BY
Francis E. Blake
ATTORNEY

ELECTRONIC RATE MARKER

Filed Oct. 29, 1957 8 Sheets-Sheet 5

Oct. 31, 1961 C. G. SHOOK 3,007,004

ELECTRONIC RATE MARKER

Filed Oct. 29, 1957 8 Sheets-Sheet 8

United States Patent Office 3,007,004
Patented Oct. 31, 1961

3,007,004
ELECTRONIC RATE MARKER

Carl G. Shook, Rochester, N.Y., assignor to General Dynamics Corporation, Rochester, N.Y., a corporation of Delaware Filed Oct. 29, 1957, Ser. No. 693,089
19 Claims. (Cl. 179—9)

This invention relates to an electronic translator and, more particularly, to a telephone system including new and improved means for translating dialed digits.

In telephone systems and in other types of data handling apparatus, such as computers and telemetering systems, it is often necessary to convert or translate plural digit entries into signals or marking conditions representative of a combination of one or more groups of the entered digits. For example, in automatic telephone systems, one or more dialed digits are often converted into different digits, the same or different in number, for automatically routing a call. Similarly, in the automatic toll ticketing system described in the copending application of Milton A. Clement and Ben A. Harris, Serial No. 536,579, filed September 26, 1955, which pending application is assigned to the same assignee as the present application, there is disclosed a called office translator circuit which operates to translate three called office code digits into a marking condition. Tihs marking condition is combined in a rate interpreter circuit with data pertaining to the calling office to supply rate information to a computer which establishes a monetary charge for the call. However, the translating facilities described in this application are somewhat costly and limited in their speed of operation because of the inclusion of some electromechanical decoding and storing components. Further, this translator is not capable of translating the additional area code digits required in nationwide toll dialing.

Accordingly, one object of the present invention is to provide a new and improved electronic translator.

Another object is to provide a telephone system including new and improved means for translating dialed digits.

A further object is to provide an electronic digital translator capable of operating at increased speeds and with reduced storage capacity.

Another object is to provide a telephone system having new and improved rate translating means for providing rate information to a computer.

Another object is to provide an electronic digital translator requiring a smaller number of intermediate storage units.

A further object is to provide a matrix type translating circuit including new and improved means for transmitting a signal through a plurality of series connected neon diode crosspoints.

Another object is to provide a digital translator including a crosspoint matrix controlled by a plurality of registers which are supplied with digits in sequence under the control of steering means, which steering means also supplies operating signals to the matrix at selected times during the storage of the digits.

Many other objects and advantages of the present invention will become apparent from a consideration of the following detailed description of an illustrative embodiment thereof in conjunction with the following drawings in which:

FIGS. 3–8 are detailed circuit diagrams of an electronic translator shown in conjunction with portions of an automatic toll ticketing system; and, FIG. 9 is a block diagram illustrating the manner in which FIGS. 3–8 are disposed adjacent each other to form a complete circuit diagram of the translator of the present invention.

Figure 1:
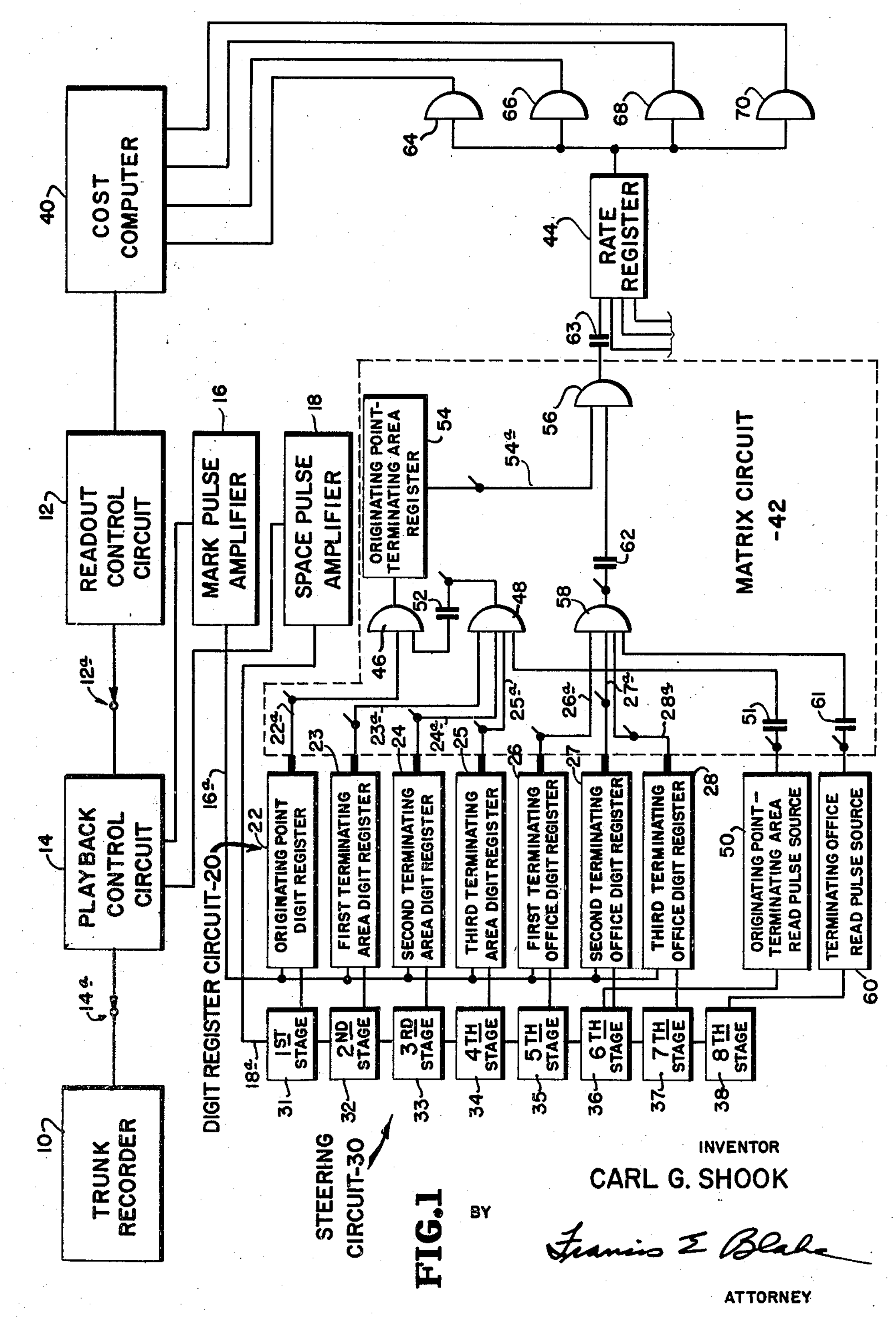
FIG. 1 is a block diagram of an automatic telephone system embodying the translating means of the present invention.

Referring now more specifically to FIG. 1 of the drawings, therein is disclosed, in block diagram form, the improved electronic rate marker of the present invention which is illustrated in conjunction with certain components of an automatic toll ticketing system of the type described and disclosed in detail in the above identified copending Clement et al application. In general, this automatic toll ticketing system includes a plurality of trunk recorders, such as a trunk recorder 10, each of which is individual to a trunk circuit through which toll calls are extended. The trunk recorder 10 preferably is of the type disclosed in the copending application of Howard S. Gleason, Serial No. 378,209, filed September 3, 1953, now Patent No. 2,867,435. As disclosed therein, the trunk recorder 10 includes an endless loop of magnetic tape adjacent to which two transversely spaced transducing heads are disposed to provide two effective channels on the magnetic tape. One of these channels is adapted to receive intelligence or mark pulses and the other of these channels is adapted to receive control or space pulses, the space signals being interposed between consecutive groups of mark pulses to define the effective ends thereof. The trunk recorder includes a step-by-step drive mechanism for advancing the magnetic tape intermittently during a recording operation and a selectively controlled continuous drive mechanism for advancing the endless loop of magnetic tape continuously during reproducing or retransmitting operations.

When the trunk circuit to which the trunk recorder 10 is connected is seized during the extension of a toll call, circuits are prepared therein for repeating the dialed digits to the recorder 10 and for supplying a space pulse following each of the dialed digits. These circuits repeat the impulses of the dialed digits directly to the mark pulse transducing head so that spaced groups of mark pulses, each containing a number of pulses equal to the value of the dialed digit is recorded on the tape. The control circuits automatically energize the space pulse transducing head to record a space signal on the magnetic tape immediately following each of the groups of mark pulses. In this manner, all of the digits dialed in extending a toll connection are recorded on the magnetic tape. If the trunk circuit is adapted for use in nationwide toll dialing, the digits dialed by the calling subscriber are generally stored in a register sender from which they are repeated, in an identical or a translated form, to the trunk recorder 10 for storage therein. In many instances, the digits provided by the register sender will include three terminating area digits representing the area in which the call is to be terminated and three terminating office digits designating the office in which the call is to be terminated. If desired, the register sender can also provide one or more digits preceding the digits identifying the terminating area and office which serve as an identification of the point from which the call originated.

Following the storage of this information in the trunk recorder 10, the trunk or adapter circuit with which the recorder 10 is associated also provides a plurality of other items of information for storage therein, such as the date on which and the time at which the call was placed, the identification of the calling subscriber, and the length that the connection was maintained, either in the form of an elapsed time entry or in the form of start and finish times from which elapsed time can subsequently be computed. At the termination of the call and following the recording of all of the necessary items of information in the trunk recorder 10, the connection is released and the adapter or trunk circuit operates to record an end-of-call signal on the tape signifying the completion of the recording of all of the items of information pertaining to the call.

When the data stored in the trunk recorder 10 is to be recorded in permanent form, a readout control circuit 12 places a switching means 12*a* associated therewith in operation to search for and seize one of a plurality of idle playback control circuits, such as a circuit 14, to which the switching means 12*a* has access. Upon the seizure of the playback control circuit 14, this circuit operates a switching means 14*a* associated therewith to search for and seize an idle trunk recorder, such as the recorder 10. Incident to placing the circuits 12 and 14 in operation, the recording and registering facilities associated with the readout control circuit 12 are cleared and placed in a normal condition in which they are capable of receiving, storing, and recording the items of information stored in the trunk recorder 10. Following the completion of this resetting or clearing operation, the playback control circuit 14 renders the continuous drive mechanism in the trunk recorder 10 effective so that the endless loop of magnetic tape is advanced to transmit a series of mark pulses through the playback control circuit 14 to a mark pulse amplifier 16 and to transmit the space pulses separating the various groups of mark pulses through the playback control circuit 14 to a space pulse amplifier 18. The mark pulse amplifier 16 amplifies and shapes the successive groups of mark pulses received from the trunk recorder 10 and applies these groups of pulses to an output conductor 16*a* which is connected in common to the input of a plurality of counting type register chains in a digit register circuit 20. The digit register circuit 20 includes an originating point digit register 22, three terminating area digit registers 23, 24 and 25 for storing the first, second, and third digits of the designation of the terminating area, and three terminating office digit registers 26, 27 and 28 which store the first, second and third digits of the designation of the terminating office.

In order to render the registers 22–28 effective in sequence to receive only a single one of the groups of mark pulses appearing on the common mark pulse conductor 16*a*, a steering circuit 30 is provided including eight successively operable switching stages 31–38. When the first group of mark pulses representing the value of the originating point digit appears on the common mark pulse conductor 16*a*, the first switching stage 31 is in a conductive condition to provide an enabling bias for the input of the register 22 and, accordingly, the value of the originating point digit is stored in the register 22. Thereafter, the successive space pulses applied to the space pulse amplifier 18 from the trunk recorder 10, which pulses are interspersed between adjacent groups of mark pulses, are amplified thereby and applied to a common space pulse conductor 18*a*. The first pulse appearing on the conductor 18*a* disables the first switching stage 31 and operates the second switching stage 32 so that the second group of mark pulses is effective to operate the first terminating area digit register 23, thereby to store the value of this digit therein. In a similar manner, the remaining switching stages 33, 34, 35, 36 and 37 are operated in sequence to enable the remaining registers 24–28 to receive the proper group of mark pulses and thus to store the values of the remaining digits of the terminating area and the digits of the terminating office designation in the proper registers.

In order to translate the digital values stored in the digit register circuit 20 into a single signal or marking condition representing the rate which is to be supplied to a cost computer 40 for establishing the monetary charge to be assessed for the call, a matrix circuit indicated generally as 42 is provided which is controlled by the values of the digits stored in the digit register circuit 20 to selectively operate a single rate register 44 for supplying the cost computer 40 with the necessary rate information. To provide a means for rendering the selected rate information dependent upon the value of the call originating point digit, the register 22, which may include a plurality of selectively fired cold cathode tubes, is connected to a plurality of gate circuits in the matrix circuit 42 to bias a selected one or more of these gates to an operative condition. As an example, the firing of a selected tube in the register 22 applies a positive enabling potential to an output conductor 22*a* which is connected to an "and" gate 46, thereby to render this gate effective to transmit a subsequently applied pulse.

To provide means for rendering the selected rate information dependent upon the values of the three terminating area digits, the registers 23, 24 and 25, which can be provided by counting chains, are connected to a group of crosspoints in the matrix circuit 42 so that a single control path including three crosspoints, each controlled by one of the registers 23, 24 and 25, is conditioned for operation. As an example, one such control path in the matrix arrangement 42 which is controlled by the registers 23, 24 and 25 is indicated schematically in FIG. 1 as an "and" gate 48 having three input paths 23*a*, 24*a* and 25*a* to which positive enabling potentials are applied in accordance with the values of the three digits stored in the registers 23, 24 and 25. These positive enabling potentials render three selected crosspoints in the matrix controlled by the registers 23, 24 and 25 effective to transmit a pulse supplied thereto.

In order to readout the translated value determined by the matrix controlled by the three terminating area digit registers 23, 24 and 25, which is illustrated as the gate circuit 48, an originating point-terminating area read pulse source 50 is provided, the output of which is connected in multiple to all of the plurality of control paths which can be established by the matrix controlled by the registers 23, 24 and 25. In order to render the pulse source 50 effective only following the completion of the storage of the three terminating area digits in the registers 23, 24 and 25, the read pulse source 50 is controlled by the sixth switching stage 36 in the steering circuit 30, which stage is operated following the completion of the storage of the first terminating office digit in the register 26. When the sixth switching stage 36 is operated, the originating point-terminating area read pulse source 50 is rendered effective to couple a positive pulse to all of the control paths in the matrix controlled by the registers 23, 24 and 25. However, only the control path represented by the "and" gate 48 is conditioned for operation and thus the pulse is supplied through a condenser 51 and the gate 48 to be applied in multiple to all of the gate circuits controlled by the register 22 representing the originating points from which the called or call terminating area can be reached.

Included in this group of gate circuits is the circuit 46 which has been provided with an enabling bias over the conductor 22*a* by the register 22. Accordingly, the positive pulse from the source 50 is further coupled through a condenser 52 and the gate circuit 46 to be applied to an originating point-terminating area register 54 which is individual to and which represents the translation of the particular originating point digit stored in the register 22 and the particular group of three terminating area digits stored in the registers 23, 24 and 25. The operation of the originating point-terminating area register 54, which may comprise a single cold cathode gaseous discharge device, applies an enabling potential to a conductor 54*a* which is connected in multiple to all of a plurality of gate circuits representing the call terminating offices located in the call terminating area designated by the digits stored in the registers 23, 24 and 25 which can also be reached from the originating point represented by the value of the digit stored in the originating point register 22. As an illustration, a gate circuit 56 is provided which is enabled by the potential applied to the conductor 54*a* and which represents that the toll call was placed from a particular originating point and was terminated in a particular area.

In order to provide means for selecting a proper rate structure in accordance with the office in which the call was terminated, the matrix circuit 42 further includes another matrix arrangement controlled by the registers 26, 27 and 28 which is effective to condition a single control path for transmitting a signal in accordance with the values of the first, second, and third terminating office digits stored in the registers 26, 27 and 28. This matrix circuit includes a plurality of control paths equal in number of permutations that can be formed by the digits stored in the registers 26, 27 and 28. Each of these control paths includes three crosspoints, each of which is rendered effective in accordance with the value of one of the digits stored in one of the registers 26, 27 and 28. In FIG. 1, this second matrix arrangement provided in the circuit 42 is represented as an "and" gate 58 which is conditioned for operation by the concurrent application of an enabling potential to each of a plurality of conductors 26*a*, 27*a* and 28*a* in accordance with the values of the three digits stored in the registers 26, 27 and 28.

To provide a means for reading out the results of the translation performed by the matrix arrangement controlled by the registers 26, 27 and 28, a terminating office read pulse source 60 is provided which is controlled by the eighth switching stage 38 in the steering circuit 30. The eighth switching stage 38 is operated following the storage of the third terminating office digit in the register 28 to insure that the matrix arrangement controlled by the terminating office digit registers 26, 27 and 28 is not actuated until after the completion of the storage of these three digits. When the terminating office read pulse source 60 is operated, a positive pulse is applied in multiple to all of the control paths provided in the terminating office decoding matrix and included in which is the gate circuit 58. Since only this gate has been rendered effective in accordance with the values of the digits stored in the registers 26, 27 and 28, the pulse supplied by the terminating office read pulse source 60 is coupled through a condenser 61 and the gate circuit 58 to be applied in multiple to all of the gate circuits in the matrix circuit 42 representing originating points from which the terminating office can be reached and also representing the terminating areas in which the terminating office is located.

The gate circuit 56 is one of these gate circuits and, as explained above, this gate circuit has been enabled as an indication that the call was placed from the originating point represented by the digit stored in the register 22 and was extended to the terminating area represented by the three digits stored in the registers 23, 24 and 25. Thus, the positive going pulse from the source 60 is further transmitted through a condenser 62, the gate circuit 56, and another coupling condenser 63 to be applied to the rate register 44. This register provides data representing the rate structure which is to be used in computing monetary charges for calls from the originating point represented by the digit stored in the register 22 to the calling office represented by the digits stored in the registers 26–28 which is located in the terminating area represented by the digits stored in the registers 23–25. The rate register 44 is also connected to all of the other gate circuits in the matrix circuit 42 for other call originating points and other call terminating offices and areas having the same rate structure. A number of other rate registers is provided in accordance with the number of different rate structures which can be assessed for any call placed within the telephone system.

When the rate register 44 is operated, pulses are transmitted through a plurailty of rate output gates 64, 66, 68 and 70 to the cost computer 40, these gate circuits normally being in an enabled condition. As an example, the gate 64 can supply information representing the base time for which a charge is to be assessed, and the gate 66 can supply information relating to the base charge to be assessed for this base time interval. The gate 68 can supply the computer 40 with information relating to the length of the overtime interval for which a monetary charge determined by the information supplied by the gate 70 is to be assessed. Thus, in the electronic rate translator illustrated in FIG. 1, the storing of the originating point digit and of the terminating area and office code digits in the digit register 20 under the control of the steering circuit 30 automatically operates the matrix circuit 42 to translate the values of the stored digits into a signal or marking condition which actuates a selected one of a plurality of rate registers, such as the register 44, to supply rate structure information to the cost computer 40 for use in establishing the monetary charge which is to be assessed for the toll call.

Figure 2:
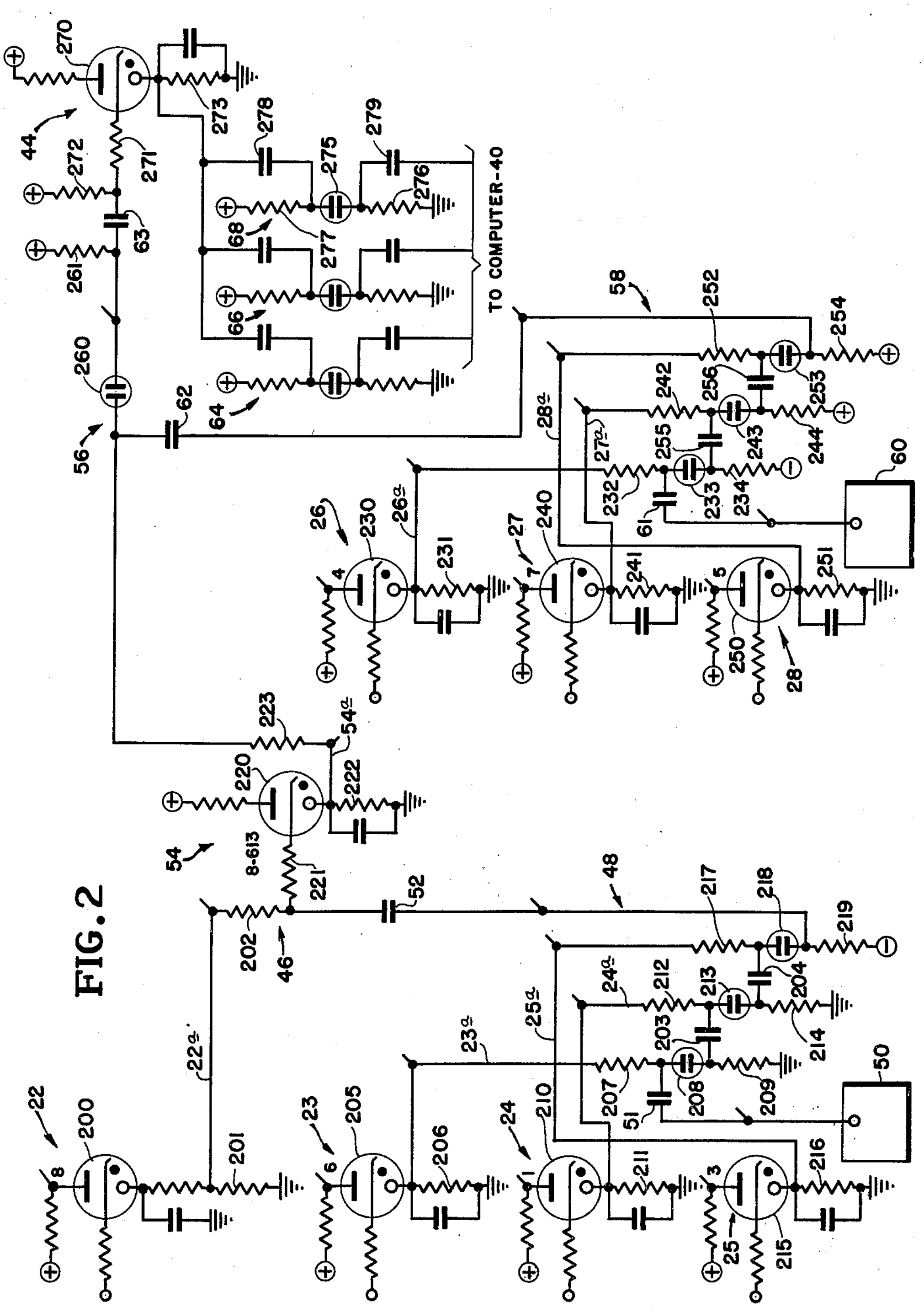
FIG. 2 is a simplified circuit diagram of the electronic translator included in the telephone system shown in FIG. 1.
Figure 3:
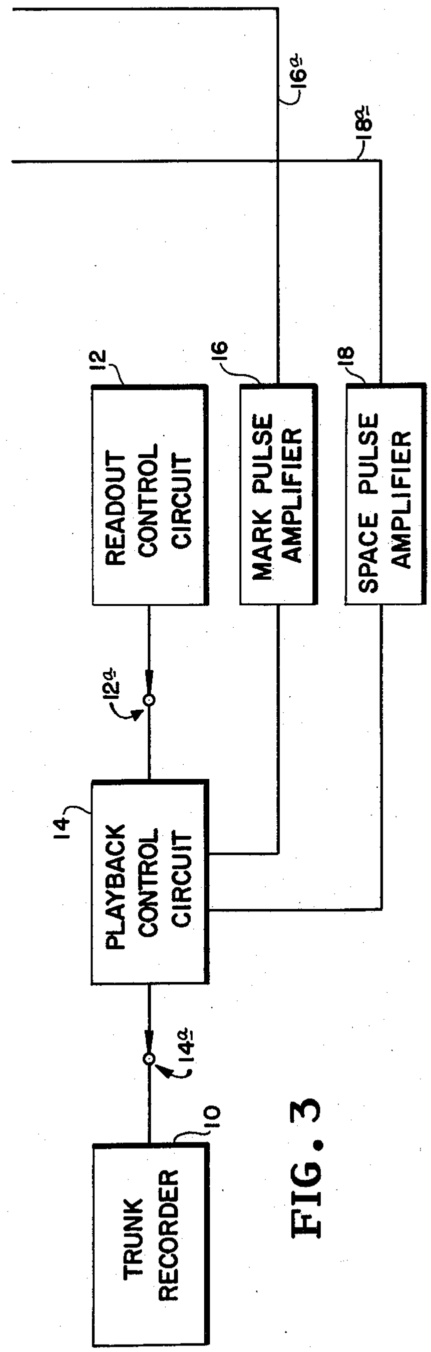
Figure 9:
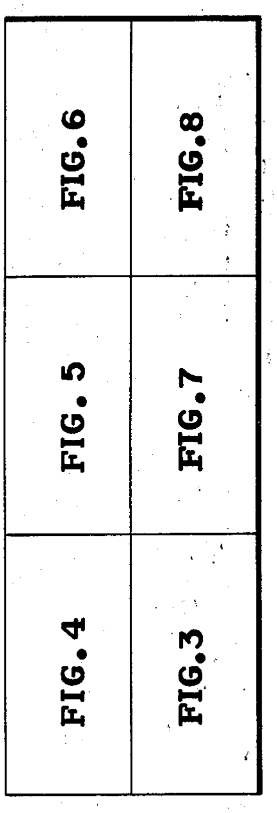
Figure 4:
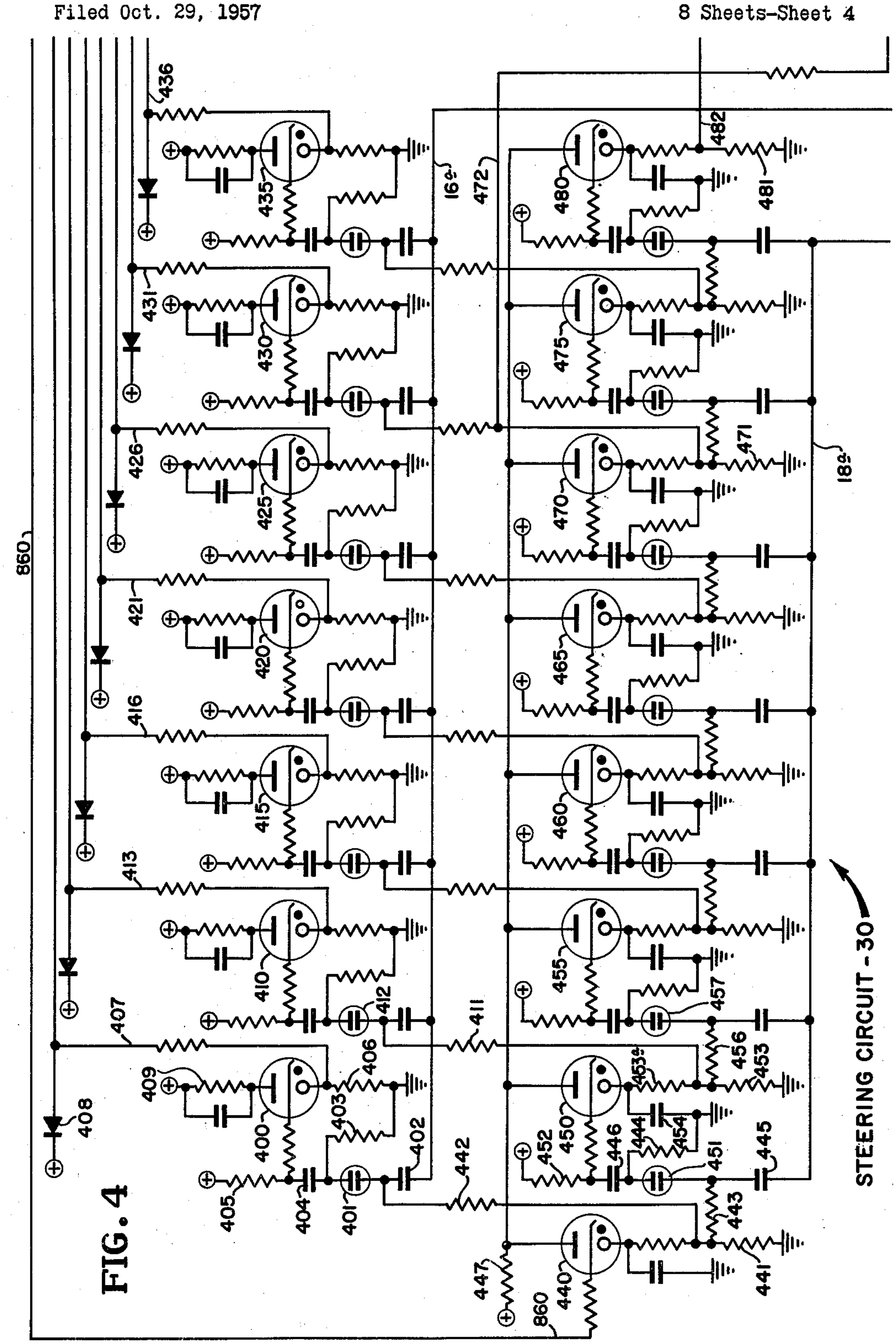

Referring now to FIG. 2 of the drawing, therein is shown, in simplified schematic form, the electronic rate marker illustrated in block form in FIG. 1. In FIG. 2, the circuit has been simplified to illustrate the translation of stored digits to provide rate information for a call placed from an originating point designated as "8" to a call terminating office designated as "475" located in a terminating area designated as "613."

To provide means for storing the value of the originating point digit, the register 22 is shown in FIG. 2 as comprising a single cold cathode tube 200 which has been rendered conductive to manifest the originating point digit "8," as indicated by the notation appearing immediately adjacent the tube 200. When the tube 200 is fired, a positive enabling potential is developed across a cathode resistor 201 which is applied to a resistor 202 forming a part of the gate circuit 46. The gate circuit 46 is connected to the control electrode of a cold cathode gaseous discharge tube 220 forming the originating point-terminating area register 54 through a series resistor 221. Thus, the application of the positive potential through the resistor 202 effectively opens the gate circuit 46 by raising the bias potential so that the tube 220 is responsive to positive pulses supplied through the coupling condenser 52. The cathode resistor 201 of the gas tube 200 is also connected in multiple to all other gate circuits similar to the circuit 46 which represent call terminating areas that can be reached from the originating point designated as "8."

To provide means for storing the values of the first, second and third terminating area digits, the registers 23, 24 and 25 are illustrated in FIG. 2 as comprising individual cold cathode tubes 205, 210 and 215 all of which have been rendered conductive to manifest the values of the stored digits "6," "1" and "3," respectively, as indicated by the notations appearing immediately adjacent these tubes. When the tube 205 is rendered conductive, a positive potential of around ninety volts is developed across a cathode resistor 206 which is applied through a series resistor 207 to one terminal of a neon diode lamp 208 forming a first cross-point in the matrix controlled by the registers 223–225. The other terminal of the neon lamp 208, which preferably is of the NE–2 type, is connected to ground through a series resistor 209. The potential supplied by the cathode resistor 206 is of a magnitude greater than the value of the breakdown potential of the neon lamp 208, which is approximately seventy volts for NE–2 type lamps. Accordingly, the neon lamp 208 is ionized at this time to prepare a first crosspoint in the matrix arrangement.

In a similar manner, the firing of the tube 210 representing the second terminating area digit "1" provides a positive potential drop across a cathode resistor 211 which is applied through a series resistor 212 to one terminal of a neon lamp 213, the other terminal of which is connected to ground through a series resistor 214. The lamp 212, which also may be of the NE–2 type, is rendered conductive to prepare a second crosspoint or gate circuit in the control path representing the terminating area. The firing of the tube 215 representing the third terminating area digit "3" provides a positive enabling potential of ninety volts across a cathode resistor 216 which is supplied through a series resistor 217 to one terminal of a neon lamp 218, the other terminal of which is connected to a negative potential of twenty volts through a series resistor 219. The lamp 218, rather than being of the NE–2 type, preferably is of the NE–96 type having a firing or ionizing potential of somewhat more than one hundred and twenty volts and a sustaining potential of approximately sixty-five volts. Since the potential drop across the cathode resistance 216 is approximately ninety volts and the fixed bias is a negative twenty volts, the potential difference of one hundred and ten volts across the neon lamp 218 is not sufficient to ionize this crosspoint.

The fired neon lamps 208 and 213 and the conditioned neon lamp 218 are coupled together by a pair of condensers 203 and 204 to provide a control path functionally represented by the "and" gate circuit 48. However, as described above, this control path or gate circuit is merely one of a plurality provided by the matrix arrangement controlled by the terminating area digit registers 23, 24 and 25. This matrix arrangement provides as many control paths or gate circuits, each including three neon lamp crosspoints, as there are possible permutations of the digits which can be stored in the registers 23, 24 and 25. Thus, the cathode resistors 206, 211 and 216 are shown as being connected in multiple. Each of these additional control paths corresponding to the functional "and" gate 48 includes two neon lamp crosspoints of the NE–2 type which are rendered conductive, such as the lamps 208 and 213, and a single neon lamp crosspoint of the NE–96 type, such as the neon lamp 218, which is merely provided with an enabling bias. The crosspoint of the NE–96 type preferably is connected as the last crosspoint in the series chain thereof afforded by the control path.

To readout the translation of the three terminating area digits and, as described above, when the sixth switching stage 36 in the steering circuit 30 is operated to condition the second terminating office digit register 27 for receiving the following group of mark pulses, the originating point-terminating area read pulse source 50 is operated to supply a positive pulse of around sixty volts to all of the control paths in the terminating area matrix arrangement. When this positive pulse is applied to the condenser 51, it is transmitted through the ionized neon lamp 208, the coupling condenser 203, and the second ionized neon lamp 213 in the conditioned control path so as to appear as a pulse of approximately sixty volts across the series resistor 214. This positive pulse ionizes the conditioned neon lamp 218, which upon ionization, effectively amplifiers the positive pulse developed across the resistor 214 to a positive pulse of greater amplitude for use in controlling the operation of the intermediate storage register 54.

More specifically, when the tube 215 is rendered conductive to forward the positive biasing potential of approximately ninety volts through the resistor 217 to one terminal of the neon lamp 218, the coupling condenser 204 is charged to a potential slightly less than ninety volts. Accordingly, when the sixty volt pulse from the read pulse source 50 is developed across the resistor 214 and since the coupling condenser 204 cannot immediately dissipate its charge, the terminal of the neon lamp 218 which is connected to the resistor 217 is instantaneously elevated to a potential of approximately one hundred and fifty volts. When considered together with the negative twenty volt bias connected to the other terminal of the lamp 218, a potential of substantially one hundred and seventy volts is now placed across the neon lamp 218. This lamp has an ionizing potential of slightly greater than one hundred and twenty volts and, accordingly, the lamp 218 is immediately ionized. However, upon ionization, the voltage drop across the lamp 218 is reduced to its sustaining potential of approximately sixty volts. Since the terminal of the lamp 218 which is connected to the coupling condenser 204 is momentarily held at a potential of approximately one hundred and fifty volts due to the inability of the condenser 204 to instantaneously change its charge, the fixed drop of around sixty volts across the lamp 218 causes the potential across the resistor 219 to be instantaneously elevated to around one hundred and ten votls. Thus, a positive pulse of approximately one hundred and ten volts is supplied to the coupling condenser 52 upon the ionization of the neon lamp 218, as contrasted with the positive pulse of approximately sixty volts developed across the resistor 214. The firing of the enabled neon lamp 218 completes the establishment of a pulse transmitting path or control path through the matrix representing the translation of the three stored terminating area digits and also provides an output pulse of greater amplitude for controlling the operation of the originating point-terminating area register 54.

The pulse supplied by firing the lamp 218 is applied in multiple to all of the gate circuits, such as the gate circuit 46, representing originating points from which the terminating area represented by the digits stored in the registers 23–25 can be reached. As indicated above, the originating point from which the call was placed is designated as "8" and the gate circuit 46 representing this digit is in an enabled condition due to the application of the positive potential to the resistance 202. Thus, when the positive pulse developed across the resistor 219 is coupled through the condenser 52, it is effective to fire the tube 220. Firing the tube 220 provides an intermediate storage of data indicating that the call was placed from the originating point designated as "8" and extended to the terminating area designated as "613," as indicated by the notation immediately adjacent the tube 220.

Operating the originating point-terminating area register 54 by firing the tube 220 provides a positive potential drop across a cathode resistor 222 which is connected in multiple to all of a plurality of gate circuits, such as the circuit 56, representing teminating offices which are located within the terminating area designated as "613" and which can be reached from the originating point designated as "8." Included in these gate circuits is the circuit 56 and, accordingly, the positive potential derived from the cathode resistor 222 is forwarded over the conductor 54*a* and a series resistor 223 to bias the gate circuit 56 to an open condition.

To provide a means for selecting the rate factor in accordance with the terminating office to which the call was extended, the matrix arrangement controlled by the registers 26, 27 and 28 is provided. These registers are represented in FIG. 2 by a plurality of cold cathode discharge tubes 230, 240 and 250 which are rendered conductive to manifest the digits "4," "7" and "5," respectively, representing the designation of the terminating office. The tube 230, which is rendered conductive to manifest the first terminating office digit "4," develops a positive potential of ninety volts across a cathode resistor 231 which is forwarded over the conductor 26*a* and a series resistor 232 to one terminal of a neon lamp 233, the other terminal of which is connected to a positive thirty volt bias through a resistor 234. The neon lamp 233 forming the first terminating office digit crosspoint preferably is of the NE–2 type and thus, the sixty volt drop across the lamp 233 does not ionize it.

To render a crosspoint effective representing the value of the second terminating office digit, the firing of the tube 240 representing the stored digit "7" provides a positive potential drop of ninety volts across a cathode resistor 241 which is applied over the conductor 27*a* and through a series resistor 242 to one terminal of an NE–2 type neon lamp 243, the other terminal of which is connected to a thirty volt positive bias through a series resistor 244. Thus, the lamp 243 is conditioned for operation, but is not ionized by the potential supplied by the fired tube 240. In a similar manner, the tube 250 which is rendered conductive in accordance with the third terminating office digit "5" provides a positive potential drop of ninety volts across the cathode resistor 251 which is forwarded over the conductor 28*a* and a series resistor 252 to be applied to one terminal of an NE–96 type neon lamp 253, the other terminal of which is connected to a negative potential of approximately twenty volts through a series resistor 254. The neon lamp 253 provides a crosspoint conditioned for operation in accordance with the value of the third terminating office digit.

The neon lamps 233, 243 and 253 are coupled together by a plurality of condensers 255 and 256 to form a control path functionally corresponding to the gate circuit 58 illustrated in FIG. 1 which represents the translation of the three terminating office digits "4," "7" and "5." It should be understood, however, that the control path represented as the gate circuit 58 is merely one of a plurality of such control paths provided in the matrix arrangement controlled by the registers 26–28 and that a plurality of other gate circuits or control paths are provided equal in number to the permutations which can be formed by the storage of different digits in the registers 26–28.

In order to readout the translated value of the digits stored in the registers 26–28, when the eighth stage 38 of the steering circuit 30 is operated, the terminating office read source pulse 60 is rendered effective to transmit a positive pulse of approximately ninety volts in multiple to all the control paths provided in the matrix arrangement controlled by the registers 26–28. This pulse is coupled through a condenser 61, among others, to ionize the neon lamp 233 and through the condenser 255 to ionize the enabled lamp 243 and thus provide a positive pulse of slightly less than ninety volts across the resistor 244. This pulse ionizes the NE–96 type lamp 253, as described above in conjunction with the lamp 218, to supply an amplified pulse of somewhat less than one hundred and thirty-five volts, the greater amplitude of this pulse being due to the increased amplitude of the input read pulse. The provision of the amplifying effect by the lamp 253 overcomes any reduction in the amplitude of the read pulse due to loss in transmission through the lamps 233 and 243. The output pulse from the lamp 253 is applied in multiple to all of the gate circuits, such as the gate circuit 56, representing the originating points from which the terminating office can be reached and the terminating area in which the terminating office is located.

Thus, the positive pulse developed across the resistor 254 is applied through the coupling condenser 62, among others, to one terminal of a neon lamp 260 forming a part of the gate circuit 56. This terminal of the neon lamp 260 is also supplied with a positive enabling potential of ninety volts from the originating point-terminating area register 54 through the resistor 223. The other terminal of the lamp 260 is connected to a positive potential of approximately thirty volts through a series resistor 261 so that the lamp 260 is not normally fired. However, the positive pulse from the condenser 62 ionizes the lamp 260 to transmit the positive read pulse through the coupling condenser 63 to the control electrode of a rate tube 270 through a series resistor 271. This control electrode is normally provided with positive enabling potential through a resistor 272 and, accordingly, the positive pulse supplied by the coupling condenser 63 is effective to fire the tube 270. This tube forms a part of the rate register 44 and represents the rate structure which is to be applied for calls originating at the point designated as "8" and extending to the office designated as "475" which is located in the area designated as "613." The rate register 44 is also connected to all other combinations of originating point-terminating area and terminating office which have identical rate structures.

To provide the computer 40 with rate structure information in accordance with the firing of the tube 270, the plurality of gates 64, 66, 68 and 70 are provided, as illustrated in FIG. 1. However, in FIG. 2 only three of these gate circuits are illustrated, i.e., the gate circuits 64, 66 and 68. Each of these gate circuits includes an NE–2 type neon lamp 275, one terminal of which is connected to ground through a series resistor 276 and the other terminal of which is connected to a positive potential of approximately sixty volts through a series resistor 277. Thus, the biasing potential normally provided across the neon lamp 275 is insufficient to cause the ionization thereof. However, the positively biased terminal of the neon lamp 275 is also coupled through a condenser 278 to a cathode resistor 273 of the rate tube 270. Thus, when the tube 270 is fired, a positive potential is coupled through the condenser 278 to render the neon lamp 275 conductive. The conduction of this lamp further transmits the positive pulse through a coupling condenser 279 to the cost computer 40, thereby providing this computer with one of the items of information in the rate structure. As described above in conjunction with FIG. 1 of the drawings, the gate circuit 68 of which the neon lamp 275 is a part provides the computer with information relating to the length of the overtime interval for which an overtime incremental charge is to be assessed. The firing of the tube 270 also actuates the gate circuits 64 and 66 to provide the computer 40 with information relating to the base time and the minimum charge to be assessed for the base time length of the call.

Thus, the storage of the originating point digit in the register 22 and of the three terminating area digits in the registers 23–25 provides a first item of information for use in determining the rate information to be supplied to the cost computer 40, which information is read out following the storage of these digits and stored in the intermediate storage unit provided by the selectively fired tube 220. Thereafter, the three terminating office digits are stored in the registers 26–28 and the matrix arrangement controlled thereby is operated to prepare a single control path represented by the gate circuit 58. This circuit is then pulsed under the control of the steering circuit 30 to provide a signal which is transmitted through the gate circuit 56 which was enabled by the tube 220 to fire the tube 270 in the rate register 44. The firing of the tube 270 supplies the necessary rate structure information to the cost computer 40.

Referring now to the detailed circuit drawings in FIGS. 3–8, an illustrative operation of the electronic rate marker disclosed therein is set forth below in conjunction with a call placed from an originating area designated as "2" to a terminating office designated as "215" located in a terminating area designated as "212." Accordingly, the magnetic tape in the trunk recorder (FIG. 3) is provided with seven groups of mark pulses consisting of two, two, one, two, two, one and five mark pulses, respectively. Each of these groups of mark pulses is followed by a space pulse which is recorded on the space channel of the magnetic tape. When the readout control circuit 12 and the playback control circuit 14 seize the trunk recorder 10 and initiate continuous movement of the magnetic tape therein, the mark and space pulses are reproduced and transmitted to the mark pulse amplifier 16 and the space pulse amplifier 18. These amplifiers shape and amplify the pulses supplied thereto and supply them to the common mark pulse conductor 16*a* and the space pulse conductor 18*a*. The mark pulse conductor 16*a* is coupled in common to the input circuits of a plurality of drive tubes 400, 410, 415, 420, 425, 430 and 435, each of which is individual to one of the registers 22–28, respectively.

As described above, the steering circuit 30 (FIG. 4) operates to sequentially render each of the registers 22–28 effective in sequence to receive the proper group of mark pulses and, to this end, the steering circuit 30 includes a plurality of cold cathode discharge tubes 440, 450, 455, 460, 465, 470, 475 and 480 which are sequentially rendered conductive under the control of the signals supplied to the conductor **18*a* by the space pulse amplifier 18. In the normal condition of the steering circuit 30, the first switching stage comprising the cold cathode tube 440 is in an operated condition in which the tube 440 is conductive. When the tube 440 is fired, a positive potential is developed across a cathode resistor 441 which is supplied through a resistor 442 to be applied to one terminal of a neon lamp 401 forming an input gate circuit for the first drive tube 400 associated with the originating point register 22. The application of the positive potential to this terminal of the neon lamp 401, which preferably is of the NE–2 type, conditions this neon lamp to transmit the first group of mark pulses to the drive tube 400. In addition, the positive potential developed across the cathode resistor 441 is forwarded over a resistor 443 to one terminal of an NE–2 type neon lamp 451 in the control electrode circuit of the tube 450 forming the second switching stage of the steering circuit 30. This enabling potential renders the tube 440 responsive to the first space pulse supplied to the conductor 18*a***.

As set forth above, the first group of mark pulses transmitted from the seized trunk recorder 10 includes two such pulses, the first of which, on application to the mark pulse conductor **16*a*, is coupled through a condenser 402 to one terminal of the enabled neon lamp 401. The other terminal of this neon lamp is connected to ground through a resistor 403 and, accordingly, the neon lamp 401 is ionized to transmit the first mark pulse through a coupling condenser 404 to the control electrode of the drive tube 400. This control electrode is normally provided with an enabling potential of approximately sixty volts through a resistor 405 so that the applied mark pulse fires the tube 400. When the tube 400 is rendered conductive, the positive potential developed across a cathode resistor 406 is transmitted over a conductor 407 to operate the originating point register 22. The firing of the tube 400 also produces a drop across an anode resistor 409 so that, after a predetermined time interval, the drive tube 400 is extinguished by relaxation. When the second mark pulse is supplied to the conductor 16*a*, the drive tube 400 is again momentarily fired to deliver a second positive pulse to the originating point register 22. A diode 408 which is connected between the conductor 407 and a positive biasing source of approximately ninety volts serves to limit the peak amplitude of the positive pulses supplied to the originating point register 22** to ninety volts.

Referring now to the originating point register 22 (FIG. 5), this register comprises a counting chain including a plurality of cold cathode discharge tubes 500, 510, and 515 representing "0," "1," and "2," respectively. The tube 500 is normally in a conductive condition so that potential drops are normally produced across an anode resistor 501 which is connected between B+ potential and the anode of the tube 500 and also across a cathode resistor 502. The potential across the resistor 502 is supplied through a resistor 503 to one terminal of an NE–2 type neon lamp 504, the other terminal of which is connected through a resistor 505 to a positive biasing potential of around thirty volts. Therefore, in the normal condition of the originating point register 22, the "0" manifesting tube 500 is in a conductive condition to supply a positive enabling potential to the neon lamp 504 which provides an input gate for the second or "1" manifesting tube 510 in the counting chain forming the register 22. When the first positive pulse is applied to the conductor 407 by the drive tube 400, it is coupled through a condenser 506 to render the lamp 504 conductive. Firing the lamp 504 transmits the pulse supplied from the drive tube 400 trough a coupling condenser 507 and a series resistor 508 to the control electrode of the second tube 510 in the counting chain. Since this control electrode is normally supplied with a positive enabling potential through a series resistor 509, the tube 510 is rendered conductive by this pulse.

Firing the tube 510 increases the current drain through the common anode resistor 501 so that the anode potential supplied to all of the tubes 500, 510 and 515 is reduced. This reduction in the anode potential of the tube 500 together with the elevated cathode potential thereof because of the drop across the cathode resistor 502 reduces the potential across the tube 500 to a point at which it is insufficient to maintain conduction and, accordingly, this tube is extinguished. When the tube 500 is extinguished, the enabling bias for the lamp 504 is removed. The firing of the tube 510 also produces a positive potential drop across a pair of cathode resistors 511 and 512, but, since the resistor 511 is shunted by a condenser 513, the cathode potential of the tube 510 does not rise immediately and this tube is not extinguished. Accordingly, at this time, the "1" manifesting tube 510 is in a conductive condition and the remaining tubes 500 and 515 in the register 22 are in a nonconductive state.

The positive drop appearing across the cathode resistors 511 and 512 is supplied through a resistor 514 to one terminal of a neon lamp 516 forming an input gate circuit for the "2" manifesting tube 515, thereby conditioning this tube to be fired by the second pulse supplied to the conductor 407 by the drive tube 400. The positive potential appearing across the cathode resistor 512 is forwarded over a conductor 517 to provide an enabling potential for an originating point-terminating area register tube 630 which performs the function of the register 54 illustrated in FIG. 1. Accordingly, the tube 630 is conditioned for operation when the value of the originating point digit is "1."

However, when the second pulse provided by the drive tube 400 is applied to the conductor 407, it is transmitted through a coupling condenser 518 to fire the neon lamp 516, thereby rendering the "2" manifesting tube 515 conductive. When the tube 515 is fired, the increased current flow through the common anode resistor 501 extinguishes the tube 510, as described above, and a positive potential drop appears across a pair of cathode resistors 519 and **519*a*. When the tube 510 is extinguished, the enabling potential for the neon lamp 516 is removed and the enabling potential supplied over the conductor 517 to the register tube 630 is removed. The positive potential appearing across the cathode resistor 519*a* is forwarded over a conductor 515*a* to be applied to a pair of resistors 612 and 621 (FIG. 6), thereby to provide an enabling potential for a pair of originating point-terminating area register tubes 610 and 620. Thus, in response to the storage of the value of the originating point digit in the register 22**, a plurality of originating point-terminating area register tubes are conditioned for operation in accordance with the value of the originating point digit.

Referring back to the operation of the steering circuit 30, when the first space pulse following the first group of mark pulses is applied to the space pulse conductor **18*a*, it is coupled to the input circuits of all of the tubes forming the various switching stages of the steering circuit, with the exception of the first stage including the tube 440. However, each of these stages is provided with an input gate, such as that afforded by the neon lamp 451. Since only the lamp 451 has been conditioned for operation, this first space pulse is effective to operate only the tube 450 forming the second switching stage 32 in the steering circuit 30. More specifically, one terminal of the neon lamp 451 is provided with a positive potential from the cathode resistor 441 of the conductive tube 440**.

The other terminal of this neon lamp is connected to ground through a series resistor 444. Accordingly, when the positive pulse is applied to the conductor 18*a*, it is coupled through a condenser 445 to ionize the lamp 451 which, in turn, transmits this pulse through a coupling condenser 446 to the control electrode of the tube 450. This control electrode is supplied with a fixed enabling potential through a series resistor 452 and, accordingly, the pulse supplied through the neon lamp 451 fires the tube 450.

Firing the tube 450 produces an increased current flow through an anode resistor 447 which is common to all of the tubes in the steering circuit 30. This increased current flow through the anode resistor 447 reduces the potential across the conductive tube 440, the cathode potential of which is now elevated, so that this tube is extinguished. When the tube 440 is extinguished, the potential drop across the common anode resistor 447 is reduced and the positive potential across the cathode resistor 441 is removed. Removing this enabling potential from the neon lamp 401 renders the drive tube 400 not responsive to mark pulses appearing on the conductor 16*a*. The disappearance of the positive potential across the cathode resistor 441 also removes the enabling potential from the neon lamp 451 so that the next space pulse supplied to the conductor 18*a* is not effective to operate the tube 450.

The firing of the tube 450 also produces a positive potential drop across a pair of cathode resistors 453 and 453*a*. A condenser 454 shunted across these cathode resistors delays the increase in the cathode potential of the tube 450 for a suitable period of time to permit the tube 440 to be extinguished so that the anode potential of the tube 450 is elevated before its cathode potential rises enough to extinguish the tube 450. When the tube 450 is fired, the positive potential provided across the cathode resistor 453 is forwarded through a series resistor 456 to one terminal of a neon lamp 457, thereby enabling the tube 455 to be fired by the next pulse supplied to the conductor 18*a*. The positive potential appearing across the cathode resistor 453 is also forwarded through a resistor 411 to one terminal of a neon lamp 412 forming an input gate circuit for the second drive tube 410 which is associated with the first terminating area digit register 23. This enabling potential permits the neon lamp 412 to be ionized by the second group of mark pulses on the conductor 16*a* so that the drive tube 412 pulses the first terminating area digit register 23 in accordance with the number of mark pulses in the second group thereof.

With the tube 450 in the steering circuit 30 now in a conductive condition, the second drive tube 410 associated with the first terminating area digit register 23 is responsive to the second group of mark pulses appearing on the conductor 16*a*. As set forth above, this includes two mark pulses so that the drive tube 410, which is similar to the drive tube 400, momentarily is fired two times to supply two positive pulses to a conductor 413. These pulses operate the first terminating area digit register 23 to a setting representing the value of the first terminating area digit.

The register 23 (FIG. 5) includes a normally conductive "0" manifesting tube 520 and a plurality of counting tubes 521, 522 and 523 manifesting the digits "1," "2" and "3," respectively. The counting chain forming the register 23 is similar to the counting chain in the originating point register 22 and operates in the manner explained in detail above. Accordingly, the application of two pulses to the conductor 413 extinguishes the tube 520, fires and extinguishes the tube 521, and renders the tube 522 conductive. When the tube 522 is rendered conductive, a positive ninety volt potential appears across a cathode resistor 524 which is forwarded over a conductor 525 to fire all of the neon lamp crosspoints in the terminating area matrix which represent the first terminating area digit "2."

More specifically, the potential applied to the conductor 525 is supplied to one terminal of a type NE–2 neon lamp 550 through a resistor 551, to one terminal of a similar neon lamp 552 through a resistor 553, and to one terminal of another similar neon lamp 554 through a series resistor 555, thereby ionizing the plurality of crosspoints provided by the neon lamps 550, 552 and 554. This potential is also forwarded to a single neon lamp crosspoint in all of the control paths or gate circuits in the terminating area matrix arrangement which represent the first terminating area digit "2." As a further illustration, if the value of the first terminating area digit is assumed to have a value of "3," the tube 523 rather than the tube 522 would be in a conductive condition at this time and an ionizing potential would be provided to a plurality of neon lamps 556 and 557 rather than the lamps 550, 552 and 554.

Figure 5:
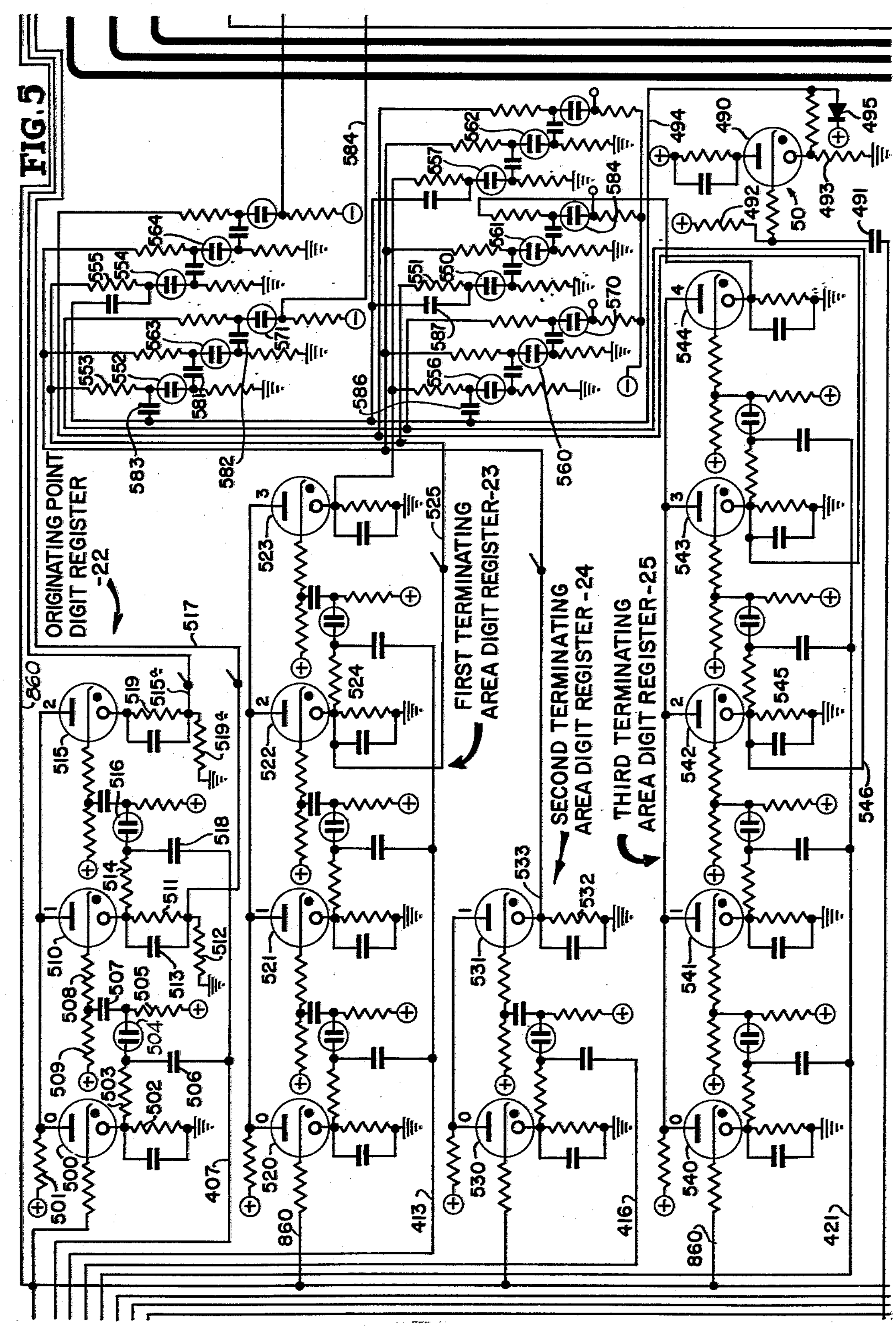

Returning now to the operation of the steering circuit 30 (FIG. 4), following the second group of mark pulses, a space pulse is applied to the conductor 18*a* which extinguishes the tube 450 and fires the tube 455 in the manner described above. Firing the tube 455 enables the drive tube 415 which forms the input to the second terminating area digit register 24. Accordingly, when the third group of mark pulses is applied to the conductor 16*a*, a single mark pulse representing the second terminating area digit "1" fires the tube 415 to supply a positive pulse to a conductor 416 for operating the second terminating area digit register 24 (FIG. 5).

This register includes a normally conductive tube 530 representing "0" and a single counting tube 531 representing the digit "1." Accordingly, the single pulse applied to the conductor 416 extinguishes the tube 530 and fires the tube 531 in the manner described above. The firing of the tube 531 produces a positive ninety volt drop across a cathode resistor 532 which is forwarded over a conductor 533 to all of the NE–2 neon lamp crosspoints in the terminating area matrix arrangement representing the second area digit "1." More specifically, this positive enabling potential is forwarded to one terminal of a plurality of neon lamps 560, 561, 562, 563 and 564, thereby ionizing all of these neon lamp crosspoints.

When the third space pulse following the third group of mark pulses is applied to the conductor 18*a*, the tube 455 is extinguished and the tube 460 is fired, thereby enabling the neon lamp input gate circuit for the drive tube 420 and disabling the neon lamp input gate circuit for the drive tube 415. Therefore, when the fourth group of mark pulses representing the third terminating area digit "2" is applied to the conductor 16*a*, the tube 420 is momentarily fired two times to apply two positive pulses to a conductor 421 for operating the third terminating area digit register 25. This register (FIG. 5) includes a normally conductive "0" manifesting tube 540 and four counting tubes 541, 542, 543 and 544 manifesting the digits "1" to "4," inclusive. The counting chain forming the register 25 operates in the same manner as the counting chain forming the register 22. Thus, the two pulses applied to the conductor 421 extinguish the tube 540, fire and extinguish the tube 541, and fire the tube 542 so that a positive potential is provided across a cathode resistor 545 which is forwarded over a conductor 546 to the NE–96 neon lamp crosspoints in the area matrix arrangement representing the third area digit "2." As an example, this positive enabling potential is forwarded to one terminal of a pair of neon lamps 570 and 571. The other terminals of these lamps are connected through a pair of series resistors to a negative potential of approximately twenty volts.

The provision of the enabling and ionizing potentials to the terminating area matrix arrangement completes the conditioning of this matrix for supplying a marking condition or signal representing the three digits forming the designation of the terminating area. At this time, only a single control path containing three serially connected neon lamps is conditioned for transmitting a read pulse in accordance with the values of the three digits stored in the registers 23–25. More specifically, only the control path or functional "and" gate including the ionized neon lamps 552 and 563 and the enabled lamp 571 representing the first, second and third terminating area digits to "2," "1" and "2" is conditioned for operation. These neon lamps are coupled in a series circuit by a pair of condensers 581 and 582. In each of the other control paths or "and" gate circuits illustrated in FIG. 5, less than three of the neon lamps are provided with a positive ionizing or enabling potential. Thus, the matrix arrangement controlled by the registers 23–25 is conditioned to supply a marking condition or signal which represents only the terminating area designation "212" in accordance with the values of the digits stored in these registers by the trunk recorder 10.

Figure 7:
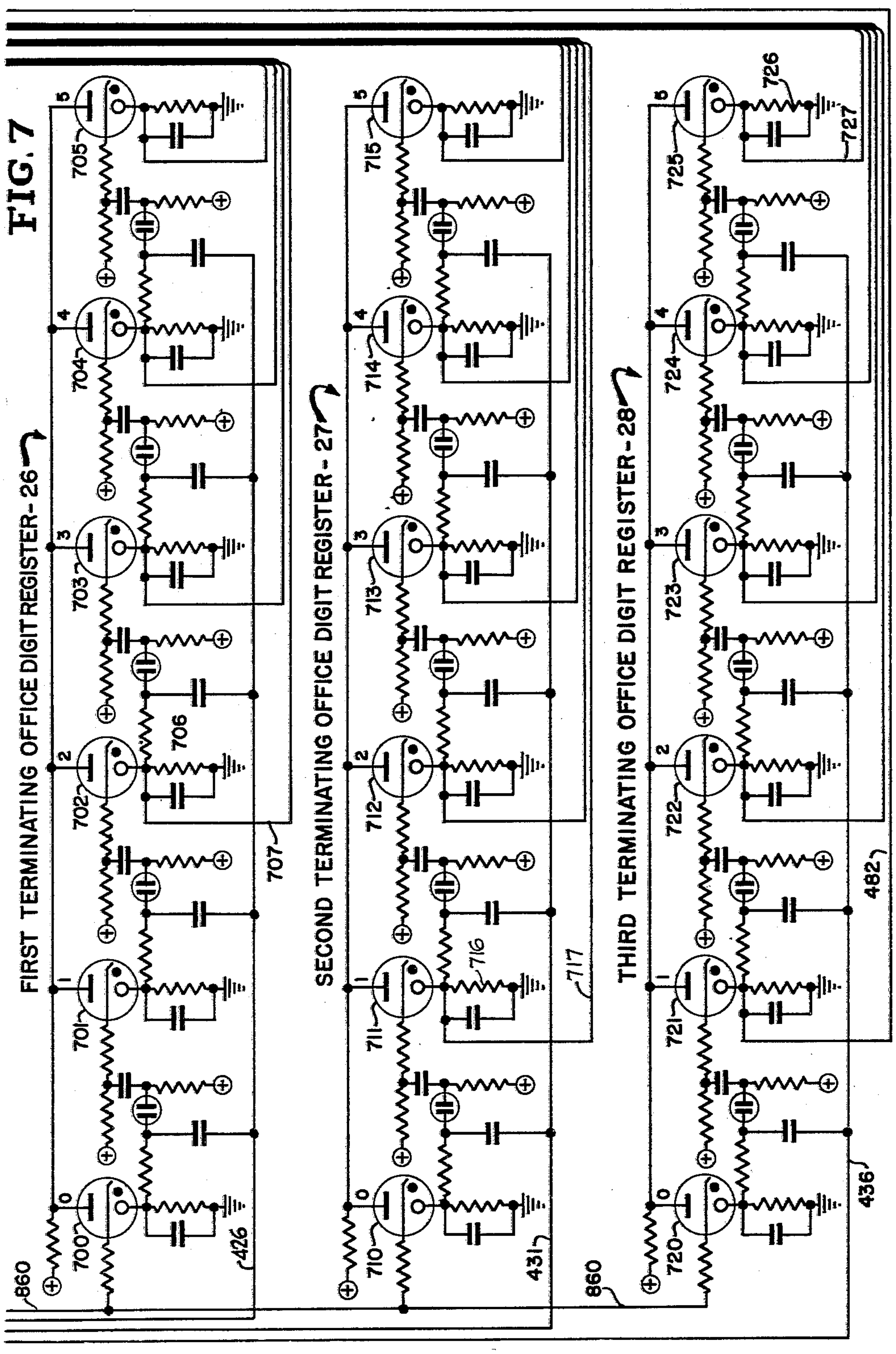
Figure 8:
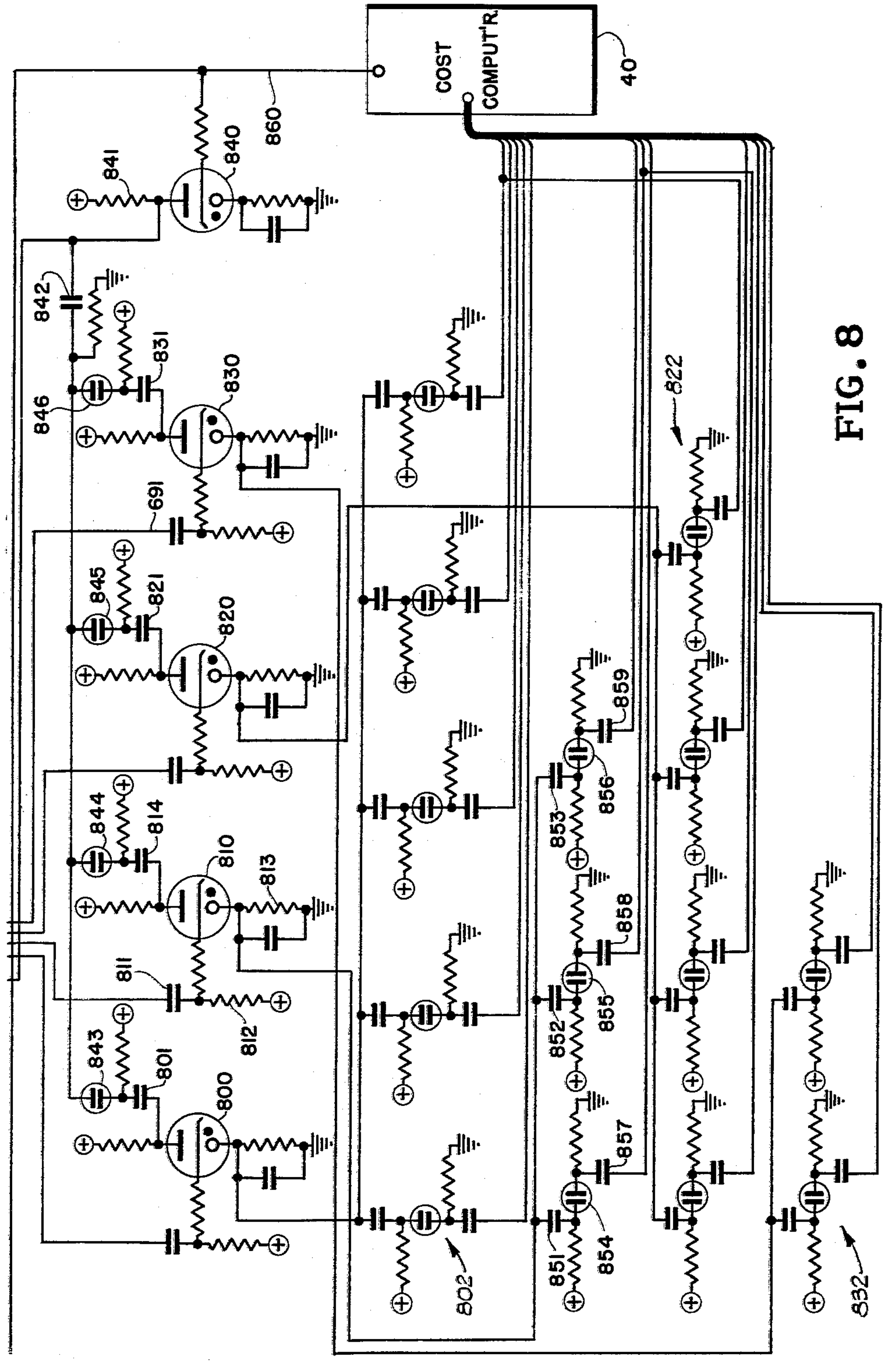

Following the completion of the storage of the terminating area digits in the registers 23–25, the steering circuit 30 operates to store the values of the three terminating office digits in the negisters 26–28 (FIG. 7). More specifically, the space pulse following the fourth group of mark pulses extinguishes the tube 460 and fires the tube 465. Extinguishing the tube 460 renders the input gate circuit for the drive tube 420 nonresponsive to mark pulses. The firing of the tube 465 provides an enabling potential for the input gate circuit to the drive tube 425 so that when the fifth group of mark pulses, two in number, is applied to the conductor 16*a*, the drive tube 425 is twice momentarily fired to supply two positive pulses to a conductor 426 for operating the first terminating office digit register 26.

The first terminating office digit register 26 (FIG. 7) includes a normally conductive "0" manifesting tube 700 and a plurality of counting tubes 701, 702, 703, 704 and 705 representing the digits "1" to "5," inclusive. The two positive pulses applied to the conductor 426 by the drive tube 425 extinguish the tube 700, fire and extinguish the tube 701, and fire the tube 702 representing the first terminating office digit "2." When the tube 702 is rendered conductive, a positive ninety volt potential appears across a cathode resistor 706 which is forwarded over a conductor 707 to all of the neon lamp crosspoints in the terminating office matrix (FIG. 6) which represent the first terminating office digit "2." As an example, this potential is applied by the conductor 707 to one terminal of a plurality of neon lamps 640, 641 and 642 of the NE–2 type. The other terminals of these lamps are connected to a positive potential of approximately thirty volts so that the enabling potential of ninety volts does not exceed the seventy volt firing potential thereof. Accordingly, the neon lamps 640, 641 and 642 are not ionized but are conditioned for operation.

Following the completion of the storage of the value of the first terminating office digit in the register 26, the next space pulse extinguishes the tube 465 and fires the tube 480. Extinguishing the tube 465 prevents the drive tube 425 from responding to mark pulses on the conductor 16*a*, and the firing of the tube 470 enables the neon lamp gate circuit associated with the drive tube 430 so as to render this tube responsive to the sixth group of mark pulses transmitted from the trunk recorder 10. However, the firing of the steering tube 470, which corresponds to the sixth switching stage 36 in the steering circuit 30, also serves to readout the digits translated by the area matrix arrangement controlled by the registers 23–25.

More specifically, when the drive tube 470 is rendered conductive to produce a potential drop across a cathode resistor 471, this positive pulse is supplied over a conductor 472 to a coupling condenser 491 which is connected to the control electrode of a cold cathode discharge device 490 forming a part of the originating point-terminating area read pulse source 50. The control electrode of the tube 490 is provided with a fixed enabling potential of sixty volts through a resistor 492, and thus the positive pulse supplied through the condenser 491 renders the tube 490 conductive. Firing the tube 490 produces a positive potential drop across a cathode resistor 493 which is applied to a conductor 494. A rectifier 495 connected between the conductor 494 and a positive potential source of approximately sixty volts limits the peak voltage of the positive pulse supplied to the conductor 494 to sixty volts. This read pulse is applied to all of the control paths in the area matrix, but only one of these control paths has been enabled to transmit this pulse, as described above.

Thus, when the positive pulse developed across the cathode resistor 493 is delivered to a coupling condenser 586, for example, this pulse is blocked at the neon lamp 556 since neither an enabling nor an ionizing potential has been forwarded to this neon lamp. Similarly, although the neon lamps 550 and 561 are provided with an ionizing potential, the transmission of the pulse supplied to a condenser 587 is blocked at a neon lamp 589 since this latter lamp receives its enabling potential from the tube 554 which is not in a conductive condition.

However, when the pulse from the read pulse source 50 is coupled through a condenser 583, it is coupled through the ionized lamp 552, the condenser 581, and the ionized lamp 563 to the couplnig condenser 582. This pulse then ionizes the lamp 571 to supply a pulse of an increased amplitude to a conductor 584 and through a coupling condenser 611 to the control electrode of the originating point-terminating area storage tube 610. This tube, together with the tube 620, is provided with an enabling potential from the conductor 515*a* and thus the tube 610 is fired to signify that the originating point digit is "2" and that the terminating area designation is "212," as indicated by the notation appearing immediately adjacent the tube 610. As a further illustration, although an enabling potential is supplied by the conductor 515*a* for the originating point-terminating area storage tube 620, this tube represents the terminating area designated "213" and thus, an operating pulse is not supplied to the control electrode of this tube by the area matrix. Similarly, although the positive pulse supplied by the conductor 584 is coupled through a condenser 631 to the control electrode of the tube 630, which represents the terminating area code "212," this tube is not rendered conductive because an enabling potential is not supplied by the conductor 517. The tube 630 stores the combination of the originating point digit "1" with the terminating area designation "212" and, accordingly, this tube can only be rendered conductive when the value of the originating point digit stored in the register 22 is "1."

The firing of the tube 610 conditions for operation a plurality of gate circuits associated with the terminating office matrix, thereby to provide means for establishing a single marking path or for establishing a single transmitting path representing the combination of different groups of terminating office digits with the determined originating point-terminating area digital combination. More specifically, when the tube 610 is fired, a positive potential is developed across a cathode resistor 613 which is supplied through a plurality of resistances 614, 615 and 616 to one terminal of a plurality of neon lamps 670, 671 and 672 thereby conditioning all of these neon lamp gates for operation.

Referring back to the above described firing of the tube 470 to initiate the operation of the originating point-terminating area read pulse source 50, the firing of this tube also renders the drive tube 430 responsive to the next group of mark pulses appearing on the conductor 16*a*. As described above, this sixth group of mark pulses includes only a single pulse which momentarily fires the drive tube 430 to supply a positive pulse to a conductor 431 for operating the second terminating office digit register 27 (FIG. 7).

Figure 6:
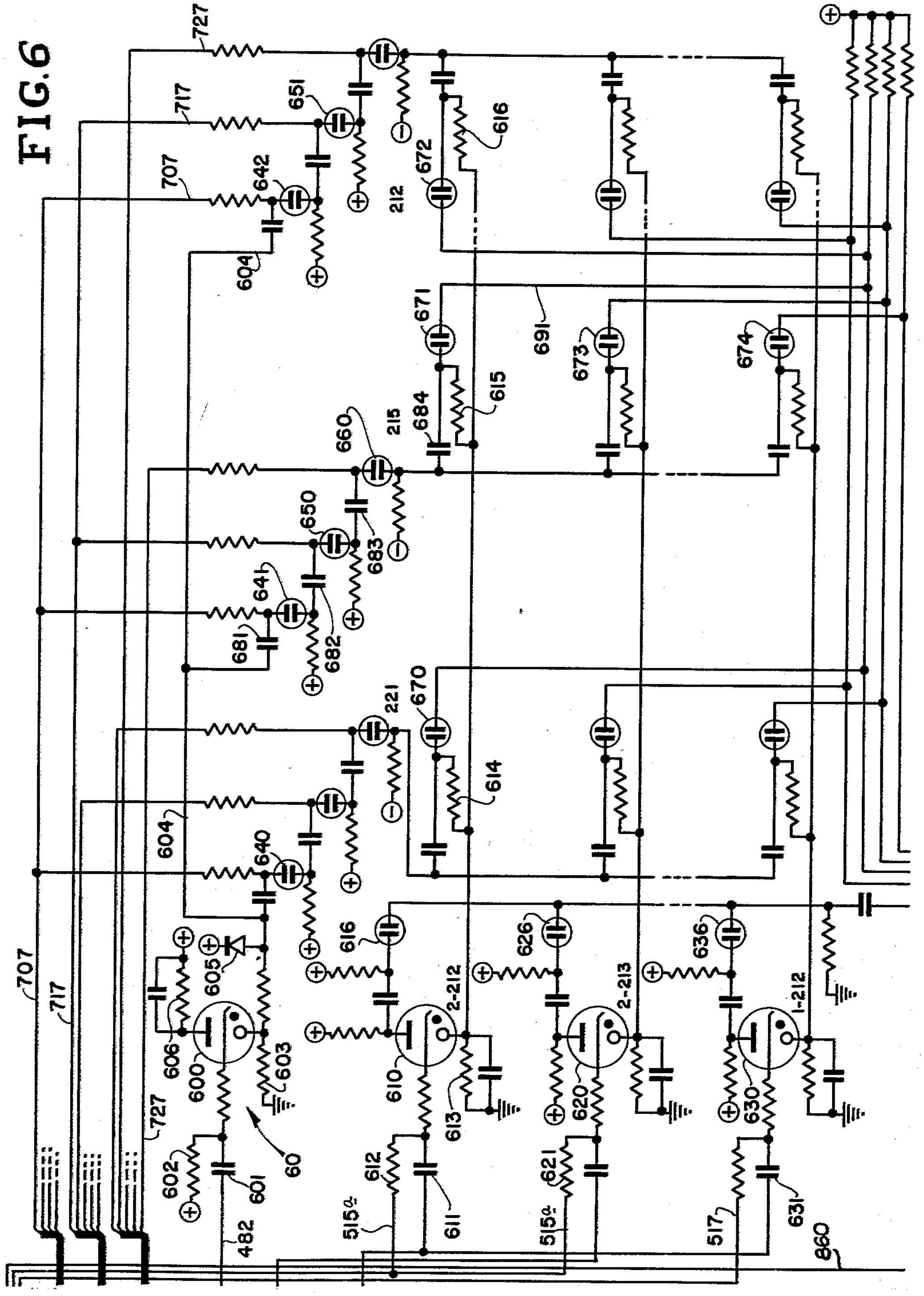

This register includes a normally conductive "0" manifesting tube 710 and a plurality of counting tubes 711, 712, 713, 714 and 715 which manifest the digits "1" to "5," inclusive. The counting chain forming the register 27 is similar in circuitry and operation to the originating point digit register 22 and, accordingly, the single pulse applied to the conductor 431 extinguishes the tube 710 and fires the tube 711 so that a positive drop of around ninety volts appears across a cathode resistor 716. This potential is applied to a conductor 717 to provide an enabling potential for a pair of neon lamps 650 and 651 (FIG. 6). The other terminals of these two neon lamps are connected to a positive potential of thirty volts so that the voltage across the lamps 650 and 651 is less than the ionizing potential. Accordingly, the crosspoint lamps 650 and 651 are enabled for conduction, but are not ionized at this time.

The space pulse following the single mark pulse extinguishes the tube 470 and fires the tube 475. Extinguishing the tube 470 disables the drive tube 430, and the firing of the tube 475 enables the input gate to the drive tube 435 so that this tube responds to the seventh group of mark pulses stored on the magnetic tape in the trunk recorder 10. As set forth above, this seventh group contains five mark pulses representing the third terminating office digit "5." Thus, when these pulses are applied to the conductor 16*a*, the drive tube 435 is fired five times to apply five positive pulses to a conductor 436 for operating the third terminating office digit register 28 (FIG. 7).

This register includes a normally conductive "0" manifesting tube 720 and a plurality of counting tubes 721, 722, 723, 724 and 725 manifesting the digits "1" to "5," inclusive. Accordingly, the five pulses applied to the conductor 436 by the drive tube 435 advance the counting chain forming the register 28 to a position in which only the "5" manifesting tube 725 is in a conductive condition. Firing the tube 725 produces a positive potential drop of around ninety volts across a cathode resistor 726 which is supplied over a conductor 727 to all of the crosspoints in the terminating office matrix representing a third terminating office digit "5." For example, the potential applied to the conductor 727 is applied to one terminal of an NE–96 type neon lamp 660, the other terminal of which is connected to a negative potential of twenty volts, thereby conditioning this neon lamp for being ionized. The conditioning of the lamp 660 together with the prior conditioning of the lamps 641 and 650 representing the first and second digits of the terminating office designation completes the preparation of a single control path in the terminating office matrix representing the designation of the terminating office. Accordingly, this matrix circuit is in condition to provide a signal for combination with the translated output stored in the originating point-terminating area storage device to select a single rate register for supplying rate information to the cost computer 40 in accordance with the stored data pertaining to the call.

In order to readout the terminating office matrix, the space pulse following the seventh group of mark pulses extinguishes the tube 475 and fires the tube 480. Extinguishing the tube 475 disables the input to the drive tube 435, and the firing of the tube 480, which represents the eighth switching stage 38 in the steering circuit 30, provides a positive potential drop across a cathode resistor 481. This positive signal is forwarded over a conductor 482 to be coupled through an input condenser 601 to the control electrode of a drive tube 600 in the terminating office drive pulse source 60 (FIG. 6). The control electrode of the tube 600 is provided with a fixed positive enabling bias through a series resistor 602 and, accordingly, the positive pulse supplied through the condenser 601 fires the tube 600 to develop a positive pulse of around ninety volts across a cathode resistor 603 which is supplied to a common pulsing conductor 604. A rectifier 605 connected between the conductor 604 and a positive potential source of around ninety volts limits the pulse supplied to the conductor 604 to a ninety volt peak value. When the tube 600 is fired, a positive drop is also produced across an anode resistor 606 which, together with the voltage drop at the cathode, extinguishes the tube 600 by the relaxation after a suitable delay.

The positive pulse applied to the conductor 604 is supplied in common to all of the control paths in the terminating office matrix. However, as set forth above, only one of these control paths includes three neon lamp crosspoints which have been enabled under the control of the digits stored in the registers 26, 27 and 28. Accordingly, the positive pulse provided from the conductor 604 is coupled through a condenser 681 to ionize the lamp 641 so that this pulse is transmitted therethrough and through a coupling condenser 682 to be applied to one terminal of the neon lamp 650. The positive pulse, in turn, ionizes the lamp 650 and is coupled through a condenser 683 to be applied to one terminal of the NE–96 type neon lamp 660. This neon lamp, in turn, is ionized and a pulse of increased amplitude is supplied to a coupling condenser 684. The pulse provided by the ionized lamp 660 is also supplied to a plurality of other neon lamps 673 and 674. However, the lamps 673 and 674 are only provided with an enabling potential when the originating point-terminating area codes are "2–213" and "1–212," respectively. Thus, the positive pulse supplied to the neon lamps 673 and 674 is ineffective to ionize these crosspoints inasmuch as an enabling potential has not been provided therefor.

The pulse supplied by the coupling condenser 684 is effective to ionize the lamp 671 inasmuch as this lamp has been provided with an enabling potential through the resistor 615 from the tube 610. Accordingly, the ionization of the tube 671 serves to transmit the pulse which has passed through the lamps 641, 650 and 660 to a conductor 691 for operating a selected rate storage device. This rate storage device, in turn, provides the cost computer 40 with the requisite rate information. The firing of the neon lamp 671 indicates that the call originated at the point designated as "1" and was extended to the office designated as "215" in the area designated as "212."

To provide means for encoding the information obtained from the originating point and terminating area and office codes, a plurality of separate rate register tubes 800, 810, 820 and 830 (FIG. 8) are provided which correspond in function to the rate register 44 illustrated in FIGS. 1 and 2. These tubes each provide different rate structures to the cost computer 40 and, accordingly, the control electrodes of these tubes are selectively strapped to the output leads from the matrix in accordance with the rate structure to be used in establishing the monetary charge for a call placed between any given originating point and any given terminating point. As an illustration, the conductor 691 is connected through a coupling condenser 811 to the control electrode of the rate tube 810. This control electrode is normally supplied with an enabling potential through a series resistor 812. Accordingly, when the neon lamp 671 is ionized and a positive pulse is applied to the conductor 691, the tube 810 is fired to produce a positive voltage drop across a cathode resistor 813. This positive pulse is supplied through a plurality of coupling condensers 851, 852 and 853 to fire a plurality of neon lamps 854, 855 and 856, all of which are provided with a fixed positive enabling bias. Thus, the neon lamps 854, 855 and 856 are ionized to supply pulses through a plurality of coupling condensers 857, 858 and 859 to provide rate information to the cost computer 40.

In a similar manner, to provide the cost computer 40 with items of information pertaining to different rate structures, the tubes 800, 820 and 830 are provided with a plurality of rate encoding gate circuit arrangements 802, 822 and 832, respectively, each including a greater or lesser number of neon lamp gate circuits similar to those shown in conjunction with the rate tube 810.

The trunk recorder 10 now operates to transmit the remaining items of information pertaining to the toll call to the registering and recording facilities associated with the readout control circuit 12, and the computer 40 is placed in operation to determine the monetary charge to be assessed for the call in accordance with the rate factor information supplied by the operated rate register tube 810. The stored data and the computed charge can then be recorded in permanent form.

Incident to the completion of the computing operation or following the completion of the storage of the rate information in the cost computer 40 or following the recording of the toll call data, the electronic translator is cleared to a normal condition. To accomplish this, the cost computer 40 momentarily applies a positive potential to a reset conductor 860. This conductor is connected to the control electrode of the first tube 440 in the steering circuit 30 and operates to render this tube conductive. When the tube 440 is fired, the increased current drain through the anode resistor 447 extinguishes the conductive tube in the steering circuit 30 so that only the tube 440 is in a conductive condition to provide an enabling potential for both the first drive tube 400 and the tube 450 in the second switching stage in the steering circuit 30. Further, the positive potential on the conductor 860 is applied to the "0" manifesting tubes in all of the registers 22–28 so that the tubes 500, 520, 530, 540, 700, 710 and 720 are placed in a conductive condition. Firing these tubes extinguishes any other conductive tube in any of the registers 22–28 and thus restores all of these registers to their normal condition. In thus being restored to their normal condition, all marking or enabling potentials are removed from the matrix arrangements controlled by these registers.

In addition, the pulse of positive potential applied to the conductor 860 momentarily fires a reset tube 840 so that the potential drop across an anode resistor 841 supplies a negative pulse through a coupling condenser 842 to one terminal of each of a plurality of neon lamps 843, 844, 845 and 846. The other terminals of these neon lamps are connected to a positive enabling potential. Accordingly, all of these neon lamps are rendered conductive by the negative pulse supplied through the condenser 842 and transmit the negative pulse through a plurality of coupling condensers 801, 814, 821 and 831 to the anodes of all of the rate register tubes 800, 810, 820 and 830. Since the rate tube 810 is now in a conductive condition, this negative pulse extinguishes the tube 810 and thus restores all of the rate register tubes to a normal condition. The neon lamps 854, 855 and 856 have previously been restored to a non-conductive state upon the dissipation of the positive pulse supplied from the cathode of the tube 810.

The firing of the tube 840 also couples a negative pulse through a plurality of gate circuits formed by a plurality of neon lamps 616, 626 and 636 to extinguish the conductive one of the originating point-terminating area intermediate storage tubes. Since, as described above, the tube 610 is in a conductive condition at this time, the negative pulse applied to the anode of this tube by the ionization of the neon lamp 616 extinguishes the tube 610 to remove the enabling potential from the neon lamps 670, 671 and 672. Accordingly, the electronic rate translator is now restored to a normal condition in which it is capable of receiving the items of information pertaining to the next telephone call.

Although the above embodiment of the invention has been described with reference to a particular type of decimal counting chain, it is obvious that the digit registers could be modified to store a greater or lesser number of digits, that the storage could be provided on a different counting basis, such as a radix of two, and that the storage of the digits could be accomplished by direct entry rather than by counting. Further, it should be understood that the matrix arrangements controlled by the registers 22–28 has been considerably simplified and that a normal commercial installation would include a considerably larger number of controlled conduction crosspoints. Although the electronic translating means of the present invention has been illustrated as useful in translating seven digits into rate factor information, this translating means is capable of use with a greater or lesser number of digits and may obviously be applied to provide routing information as well as rate information.

Accordingly, it should be understood that although the principles of the present invention have been described with reference to a specific embodiment thereof, it is obvious that numerous other modifications and embodiments may be devised by those skilled in the art which will fall within the spirit and scope of these principles.

What is claimed and desired to be secured by Letters Patent in the United States is:

1. An electronic rate translator for use with a computer requiring rate information consisting of one or more rate items, comprising a first group of registers for storing digits representing the area in which a telephone call is terminated, a second group of registers for storing digits representing the office in which a telephone call its terminated, a pair of matrices each connected to and controlled by one of said groups of registers, each of said matrices including a plurality of coordinately arranged conduction devices each having a control electrode adapted to receive a control signal from one of the registers, a gate circuit connected to and controlled by one of said matrices to be conditioned to pass a signal when a particular combination of digits is stored in the related group of registers, means for operating said gate circuit by transmitting a signal through the group of conduction devices in said one matrix which represents the digits stored in the related group of registers, a rate storage device controlled by said gate circuit, means coupling the other of said matrices to said gate circuit, and means for transmitting a signal through a selected number of the conduction devices in said other of the matrices to said gate circuit when a particular combination of digits is stored in the related group of registers, said signal passing from said other of the matrices through said gate circuit to operate said rate storage device in accordance with the values of the digits stored in said first and second groups of registers.

2. The rate translator set forth in claim 1 in which said rate storage device comprises a selectively fired electronic device, and a plurality of gate circuits coupled to the electronic device each representing one of said rate items.

3. The rate translator set forth in claim 1 including an additional register for storing a digital value representing the area in which a call originates, and an intermediate storage device conjointly controlled by said additional register and said one of the matrices for selectively conditioning said gate circuit to pass a signal.

4. An electronic digital translator comprising a first group of registers each adapted to store a digit, gate means, first matrix means connected to said gate means and controlled by said first group of registers to render said gate means operative to transmit a signal only when a particular combination of digits is stored in said first group of registers, a second group of registers, each of the registers in said second group including a plurality of controllable conduction devices having at least one output electrode, a matrix circuit including a plurality of gaseous diode crosspoint elements, means coupling said output electrodes to said crosspoint elements, means coupling said matrix circuit to said gate means, means for storing digits in said second group of registers to render different ones of said devices effective in accordance with the values of the stored digits, the operation of said devices supplying potentials to a serially related group of said crosspoint elements in accordance with the values of the stored digits, means for supplying an operating signal to said serially related crosspoint elements for transmission therethrough to said gate means, and output means controlled by said gate means and operated in accordance with a signal supplied through said matrix circuit and said gate means.

5. An electronic translator comprising a matrix circuit including a plurality of controlled conduction devices and circuit means connecting said conduction devices into a plurality of different control paths each including a group of said conduction devices connected in a series in a series relationship, all of said conduction devices being normally non-conductive and being capable of being rendered conductive by the application of potential thereto, at least one of the conduction devices in each of said control paths having the characteristic of remaining conductive following firing with an applied potential less than the potential necessary to produce firing; marking means connected to said matrix circuit for applying a potential to all of the conduction devices in a selected one of said control paths which is slightly less than the potential necessary to render the devices in said selected control path conductive; signal means for applying a signal to said selected control path to sequentially render all of the devices in said selected path conductive so that said signal is transmitted over said selected control path; and translator output means connected to said matrix circuit and operated by the signal transmitted over said selected control path.

6. The translator set forth in claim 5 in which the said one conduction device in the selected control path is connected as the last such device in said series relationship at the point most remote electrically from said signal means.

7. An electronic digital translator comprising a plurality of registers each adapted to store a digit, digit sending means operable to supply digits for storage in said registers, steering means comprising a series of sequentially fired electronic devices, means coupling each of said registers to one of said devices so that the sequential firing of said devices renders said registers effective to receive and store the digits from said sending means, output means, matrix means connected to said output means and controlled by the values of the digits stored in said registers, and means including at least one of said electronic devices for supplying operating signals to said matrix means.

8. In an electronic digital translator, a plurality of registers each adapted to store a digit, steering means for entering digits in said registers in sequence, first matrix means controlled by a first group of said registers for preparing a control path in accordance with the values of the digits stored in said first group of registers, second matrix means controlled by a second group of said registers for preparing a control path in accordance with the values of the digits stored in said second group of registers, output means controlled by said first and second matrix means, and signaling means controlled by said steering means for applying signals to said control paths to operate said output means.

9. The translator set forth in claim 8 in which said signaling means includes means operated by said steering means following the storage of the digits in said first group of registers for applying a signal to said first matrix means, and means operated by said steering means following the storage of the digits in said second group of registers for applying a signal to said second matrix means.

10. An electronic digital translator comprising a plurality of registers each adapted to store a digit, a digit sending source operable to supply digits for storage in said registers, a steering circuit comprising a series of sequentially fired electronic devices, means coupling each of said registers to one of said electronic devices so that the sequential firing of said devices renders said registers effective in sequence to receive and enter digits from said source, matrix means controlled by said registers for preparing control paths in accordance with the values of the digits stored in said registers, output means connected to and controlled by said matrix means, and means including selected ones of the electronic devices in said steering circuit for applying signals to said control paths in said matrix means for selectively operating said output means.

11. The translator set forth in claim 10 in which the control paths in said matrix means include a plurality of serially connected diode devices conditioned for conduction in accordance with the values of the digits stored in said registers, and in which the signals applied to said control paths render said diode devices conductive to transmit said signals to said output means.

12. In a telephone system in which calls are extended to various call terminating areas and offices, first register means for storing digits representative of a call terminating area and a call terminating office, a plurality of second registers each adapted to store one of the digits stored in said first register means, digit entering means controlled by said first register means for transmitting the digits stored therein to said second registers and for entering said digits in sequence in said second registers, first matrix means controlled by a first group of said second registers, second matrix means controlled by a second group of said second registers, gate means controlled by said first matrix means and connected to said second matrix means, first means operated by said entering means after the entry of the digits into said first group of second registers for operating said first matrix means to render said gate circuit effective to transmit a signal, second means operated by said entering means after the entry of the digits into said second group of said second registers for transmitting a signal through said second matrix means and said gate means, and an output device controlled by the signal transmitted through said gate means.

13. In a telephone system in which calls are extended to various call terminating areas and offices, first register means for storing digits representing the area and office in which a call is terminated, a plurality of second registers each adapted to store one of the digits stored in said first register means, a steering circuit for rendering each of said second registers effective in sequence to receive and store one of said digits, first matrix means controlled by a first group of said second registers in accordance with the values of the digits stored therein, second matrix means controlled by a second group of said second registers in accordance with the values of the digits stored therein, output means controlled by said first and second matrix means, and means controlled by said steering circuit for supplying operating signals to said first and second matrix means in a timed relation with the storage of digits in said second registers, thereby to selectively operate said output means in accordance with the values of the digits stored in said second registers.

14. In a telephone system for extending calls to various call terminating areas and offices, storage means for storing digits representing a call terminating area and a call terminating office, a plurality of registers each adapted to store one of said digits, digit transferring means controlled by said storage means for transferring the digits from said storage means to said registers, a steering circuit including a plurality of sequentially operable electronic devices, each of said registers being coupled to one of said electronic devices, means for operating said electronic devices in succession to render said registers effective in sequence to receive digits for storage from said digit transferring means, the digits representing the call terminating area being stored in a first group of said registers and the digits representing the call terminating office being stored in a second group of said registers, a first matrix circuit connected to said first group of registers and controlled in accordance with the values of the digits stored therein to prepare a first control path representing the translation of the digits pertaining to the call terminating area, a second matrix circuit connected to said second group of registers and controlled in accordance with the values of the digits stored therein to prepare a second control path representing the translation of the digits pertaining to the call terminating office, translator output means controlled by said first and second matrix circuits to provide a signal representing the translation of the call terminating area and office digits, and means including selected ones of said electronic devices for supplying operating signals to said control paths for operating said translator output means.

15. In a telephone system for extending calls to various call terminating areas and offices from various call originating points; storage means for storing digits representing a call terminating area, a call terminating office, and a call originating point; a plurality of registers each adapted to store one of said digits; digit transferring means controlled by said storage means for transferring the digits from said storage means to said registers; a steering circuit including a plurality of sequentially operable electronic devices, each of said registers being coupled to one of said electronic devices; means for operating said electronic devices in succession to render said registers effective in sequence to receive digits for storage from said digit transferring means, the digits representing the call terminating area being stored in a first group of said registers, the digits representing the call terminating office being stored in a second group of said registers, and the digit representing the call originating point being stored in a third register; a first matrix circuit connected to said first group of registers and controlled in accordance with the values of the digits stored therein to prepare a first control path representing the translation of the digits pertaining to the call terminating area; a second matrix circuit connected to said second group of registers and controlled in accordance with the values of the digits stored therein to prepare a second control path representing the translation of the digits pertaining to the call terminating office; gate circuit means controlled by said third register and the control paths in said first and second matrix circuits; translator output means controlled by said gate circuit means to provide a signal representing the translation of the call terminating area and office digits and the call originating point digit; and means including selected ones of said electronic devices for supplying operating signals to said control paths for operating said translator output means.

16. An electronic digital word translator comprising a plurality of digit registers, each of said registers including a plurality of electronic devices operable to different patterns of conductive conditions each representing the value of an entered digit, each of said digit registers including output means operable to supply a unique output potential determined by the conductive pattern in the register which is individual to the value of the digit then stored in the register; a matrix including a plurality of controlled conduction devices connected in a coordinate network arrangement and connected to said output means so that different combinations of said conduction devices are conditioned for operation in accordance with the unique potentials supplied by the entrance of digits into said plurality of digit registers; a read signal source connected to said matrix circuit and operable following the entrance of digits into said plurality of digit registers to supply a read signal to said matrix circuit, said read signal being transmitted through only the conduction devices conditioned by said unique potentials to provide an output signal individual to the digital word formed by the digits entered into said plurality of digit registers; and indicating means connected to said matrix circuit and operated by said output signal to provide an indication of the digital word entered into said plurality of digit registers.

17. An electronic digital translator comprising a plurality of digit registers, each of said registers including a plurality of electronic devices operable to different patterns of conductive conditions each representing the value of an entered digit, each of said digit registers including output means operable to supply a unique output potential determined by the conductive pattern in the register which is individual to the value of the digit then stored in the register; a steering circuit including a plurality of successively fired electronic devices; means controlled by individual ones of said electronic devices for rendering said registers effective in sequence to store entered digits; a matrix including a plurality of controlled conduction devices connected to said output means so that different combinations of said conduction devices are conditioned for operation in accordance with the unique potentials supplied by the entrance of digits into said plurality of digit registers; a read signal source connected to said matrix circuit and operable under the control of said steering circuit following the entrance of digits into said plurality of digit registers to supply a read signal to said matrix circuit, said read signal being transmitted through only the conduction devices conditioned by said unique potentials to provide an output signal individual to the digits entered into said plurality of digit registers; and indicating means connected to said matrix circuit and operated by said output signal to provide an indication of the digits entered into said plurality of digit registers.

18. An electronic digital translator comprising a plurality of digit registers, each of said registers including a plurality of electronic devices operable to different patterns of conductive conditions each representing the value of an entered digit, each of said digit registers including output means operable to supply a unique output potential determined by the conductive pattern in the register which is individual to the value of the digit stored in the register; a pair of matrix circuits each including a plurality of controlled conduction devices, the conduction devices in said matrix circuits being connected to the output means in different groups of said digit registers so that different combinations of said conduction devices in each of said matrix circuits are conditioned for operation in accordance with the unique potentials supplied by the entrance of digits into said different groups of digit registers; a read signal source connected to said matrix circuits; first means for operating said read signal source following the entrance of digits into one of said groups of digit registers to supply a first read signal to one of said matrix circuits, said first read signal being transmitted through only the conduction devices conditioned by the unique potentials representing the digits entered into said one group of digit registers to provide a first output signal; a signal responsive gate means controlled by said output signal; second means for operating said read signal source to supply a second read signal to the other of said matrix circuits following the entrance of digits into the other of said groups of digit registers, said second read signal being transmitted through only the conduction devices conditioned by the unique potentials representing the digits entered into said other group of digit registers to provide a second output signal; and means for supplying said second output signal through said voltage responsive gate means to provide a signal representing all of the digits stored in said plurality of registers.

19. An electronic digit translator comprising a plurality of digit registers, each of said registers including a plurality of electronic devices operable to different patterns of on and off conductive conditions representing the values of different entered digits, each of said digit registers having a plurality of output leads to one of which a potential is supplied for each conductive pattern in the register to represent the value of an entered digit; a translating matrix circuit connected to all of said plurality of digit registers, said matrix circuit including a plurality of controlled conduction devices each having at least one control electrode; means coupling each of said output leads to the control electrode of at least one of said conduction devices so that at least a number of said conduction devices equal to the number of said plurality of digit registers is conditioned for operation; a read signal source connected to said matrix circuit and operable following the entrance of digits into said plurality of digit registers for supplying a read signal to said matrix circuit that is transmitted through said number of conditioned conduction devices to provide an output signal representative of only the digits stored in said plurality of digit registers; and an output means connected to said matrix circuit and operated by the output signal supplied by said matrix circuit to provide an indication individual to the combination of digits stored in said plurality of digit registers.

References Cited in the file of this patent

UNITED STATES PATENTS

| | | |
|---|---|---|
| 2,686,299 | Eckert | Aug. 10, 1954 |
| 2,743,316 | Mallery | Apr. 24, 1956 |
| 2,851,534 | Bray et al. | Sept. 9, 1958 |
| 2,876,289 | Faulkner | Mar. 3, 1959 |
| 2,912,511 | McKim | Nov. 10, 1959 |